(12) United States Patent
Horikawa et al.

(10) Patent No.: US 11,153,458 B2
(45) Date of Patent: Oct. 19, 2021

(54) IMAGE PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Kazuhiko Horikawa, Kanagawa (JP); Ryosuke Yonesaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/830,414

(22) Filed: Mar. 26, 2020

(65) Prior Publication Data

US 2021/0092252 A1    Mar. 25, 2021

(30) Foreign Application Priority Data

Sep. 20, 2019  (JP) .............................. JP2019-172239

(51) Int. Cl.
| | | |
|---|---|---|
| H04N 1/193 | (2006.01) | |
| H04N 1/03 | (2006.01) | |
| H04N 1/028 | (2006.01) | |
| H04N 1/10 | (2006.01) | |
| G06F 3/12 | (2006.01) | |

(52) U.S. Cl.
CPC ......... *H04N 1/1937* (2013.01); *H04N 1/0285* (2013.01); *H04N 1/0303* (2013.01); *H04N 1/0305* (2013.01); *H04N 1/1013* (2013.01)

(58) Field of Classification Search
CPC .. H04N 1/0288; H04N 1/0287; H04N 1/0285; H04N 1/0284; H04N 1/0282; H04N 1/0303; H04N 1/0305; H04N 1/00822; H04N 1/2361; H04N 1/1937; H04N 1/1013; H04N 2201/0458; G03G 2215/0463; G03G 2215/0417; G03G 15/04036; G03G 15/1228; G03G 15/1223; G01N 21/47; G01N 21/4738; G01N 21/4754; G01N 2021/7773; G01N 2021/0634; G01N 2021/4776; G01N 2223/052; G01N 2223/05
USPC ....... 358/471, 475, 480, 481, 486, 450, 443, 358/408, 509, 1.9, 2.1
See application file for complete search history.

(56) References Cited

U.S. PATENT DOCUMENTS

| | | | |
|---|---|---|---|
| 7,643,183 B2 | 1/2010 | Nakaya et al. | |
| 10,999,450 B2 * | 5/2021 | Yamamura | ......... H04N 1/00034 |
| 2009/0027745 A1 * | 1/2009 | Kweon | ................... H04N 1/203 |
| | | | 358/498 |
| 2009/0196641 A1 * | 8/2009 | Banton | .............. G03G 15/5062 |
| | | | 399/67 |

(Continued)

FOREIGN PATENT DOCUMENTS

JP    2006-279228 A    10/2006

*Primary Examiner* — Chad Dickerson
(74) *Attorney, Agent, or Firm* — Oliff PLC

(57) ABSTRACT

An image processing apparatus includes a reading unit and a controller. The reading unit radiates light to a target from two directions with different angles and reads images of the target. The controller performs, when controlling the reading unit to acquire the two images of the target, control such that a resolution of the image read by radiating the light to the target from one of the two directions is lower than a resolution of the image read by radiating the light to the target from the other one of the two directions.

11 Claims, 15 Drawing Sheets

(56) References Cited

U.S. PATENT DOCUMENTS

2012/0307322 A1* 12/2012 Ozawa ................. H04N 1/0287
                                                           358/475
2013/0010338 A1*  1/2013 Tanaka ............... H04N 1/00795
                                                           358/475
2014/0347705 A1* 11/2014 Umemoto .......... H04N 1/40093
                                                           358/474

* cited by examiner

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-172239 filed Sep. 20, 2019.

BACKGROUND

(i) Technical Field

The present disclosure relates to an image processing apparatus and a non-transitory computer readable medium.

(ii) Related Art

Japanese Unexamined Patent Application Publication No. 2006-279228 discloses an imaging apparatus that performs two scanning operations including scanning based on diffused reflection light and scanning based on regular reflection light and combines images obtained by the scanning operations to obtain an image excellently representing both texture and color.

SUMMARY

Aspects of non-limiting embodiments of the present disclosure relate to providing an image processing apparatus and a non-transitory computer readable medium capable of reducing the amount of image data required to be stored when obtaining two pieces of image data used to display an image reproducing glossiness of a target, the two pieces of image data being obtained by radiating light to the target from two directions with different angles, compared to a case where two pieces of image data with the same resolution are obtained.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a reading unit and a controller. The reading unit radiates light to a target from two directions with different angles and reads images of the target. The controller performs, when controlling the reading unit to acquire the two images of the target, control such that a resolution of the image read by radiating the light to the target from one of the two directions is lower than a resolution of the image read by radiating the light to the target from the other one of the two directions.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described in detail with reference to drawings.

Figure 1:
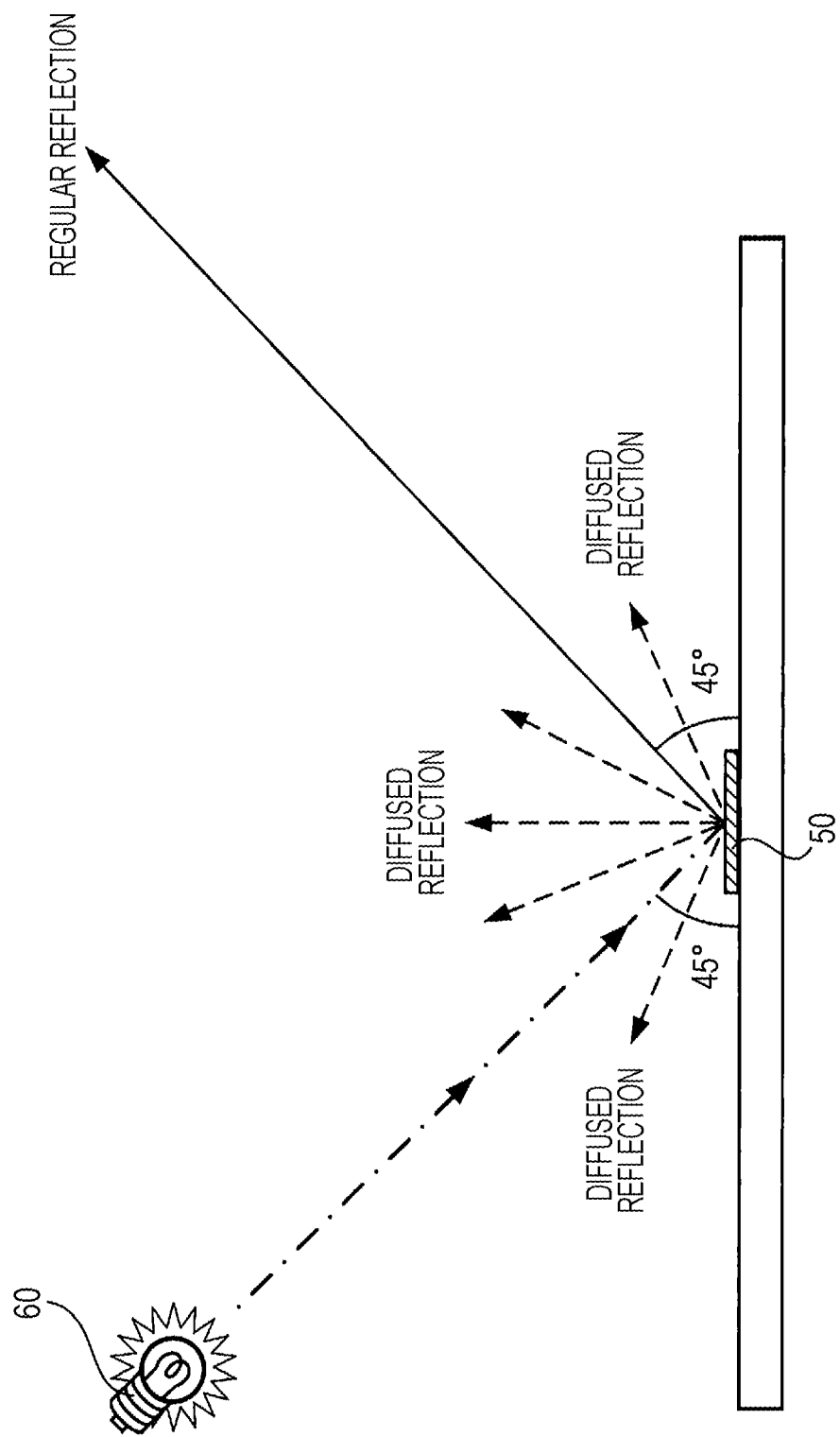
FIG. 1 is a diagram for explaining regular reflection and diffused reflection.

First, prior to explaining an image reading device according to an exemplary embodiment of the disclosure, regular reflection and diffused reflection will be explained with reference to FIG. 1. FIG. 1 is a diagram for explaining a reflection state in a case where light is radiated from a light source 60a to a reading target 50. In the case where the reading target 50 is fully flat, light incident to the reading target 50 at an angle of incidence is reflected at an angle of emission, which is equal to the angle of incidence. For example, in FIG. 1, when light from the light source 60 enters the reading target 50 at an angle of 45 degrees, the light is reflected at an angle of emission of 45 degrees. The reflection in which the angle of incidence is equal to the angle of emission is called regular reflection, and light reflected by regular reflection is called regular reflection light.

In contrast, in the case where the surface of the reading target 50 is not fully flat, light radiated to the reading target 50 is reflected at various angles of emission. The reflection in which the angle of incidence is not equal to the angle of emission is called diffused reflection, and light reflected by diffused reflection is called diffused reflection light.

In the case where light is radiated to an object such as metal with high glossiness, strong regular reflection light is obtained. In contrast, in the case where light is radiated to an object with low glossiness, weak regular reflection light is obtained.

In general image reading devices, an image based on diffused reflection light from a reading target (hereinafter, referred to as a diffused reflection light image) is obtained as a scanned image of the reading target. This is because the diffused reflection light image contains color information of the reading target and the color tone of the reading target may be obtained based on the diffused reflection light image.

However, most of reflection light from a part with a high reflectivity is regular reflection light. Therefore, in the case where a diffused reflection light image is read from a target including a part with a high reflectivity, the part of the diffused reflection light image with the high reflectivity becomes a dark image.

Figure 2:
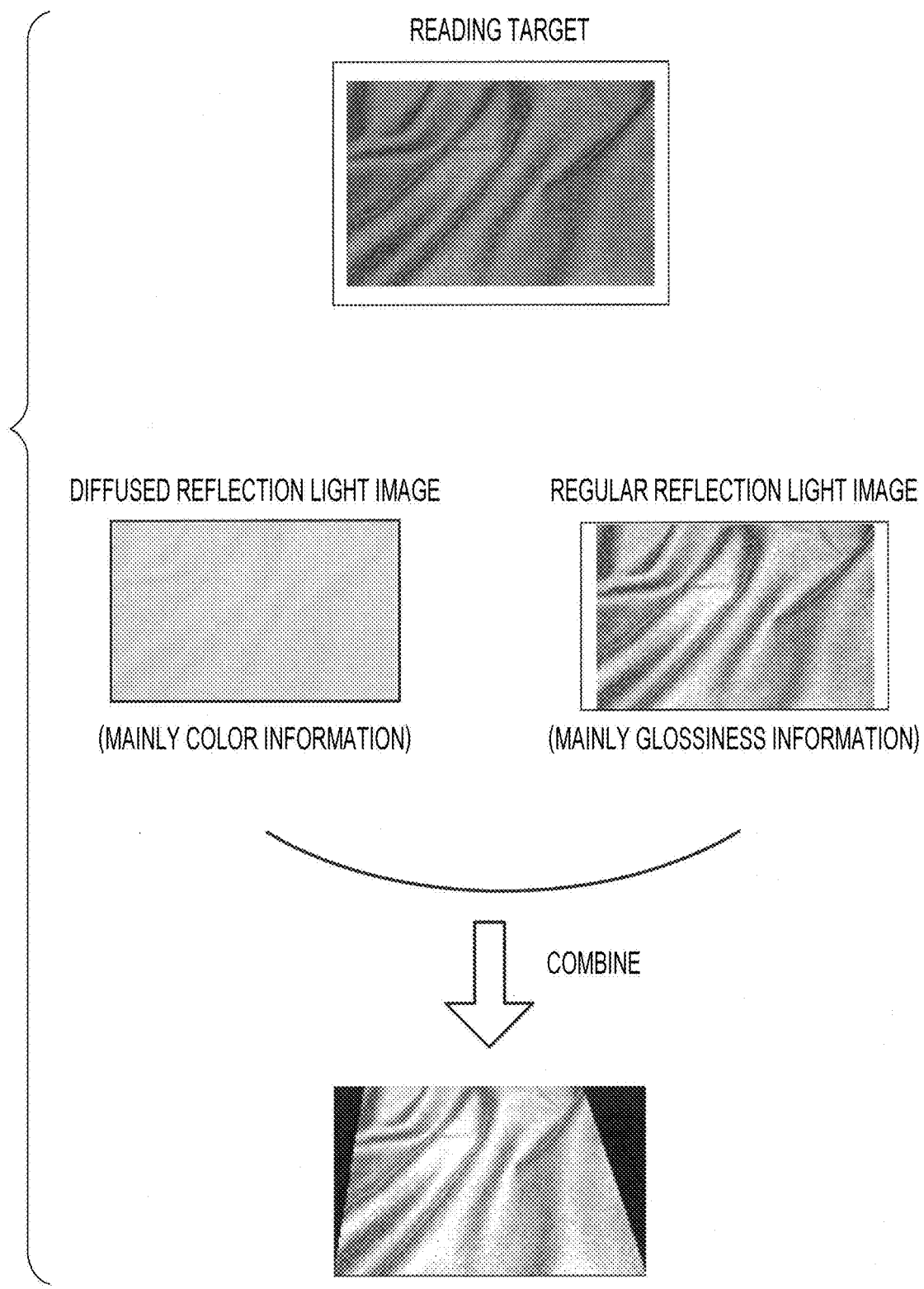
FIG. 2 is a diagram for explaining generation of an image reproducing glossiness by reading a diffused reflection light image and a regular reflection light image from a reading target and combining the images.

Thus, as illustrated in FIG. 2, not only a diffused reflection light image of a reading target but also an image based on regular reflection light from the reading target (hereinafter, referred to as a regular reflection light image) is read, and the read diffused reflection light image and regular reflection light image are combined. Accordingly, an image reproducing glossiness may be generated.

By reproducing glossiness, texture and smoothness of the target displayed in the image may also be reproduced. Accordingly, an image reproducing texture in a broad meaning as well as glossiness may be generated.

By changing a method for combining a regular reflection light image with a diffused reflection light image, glossiness in the composite image may be adjusted. Thus, by changing glossiness, an image obtained when a target is viewed from various angles may be generated.

However, to display an image with a changed glossiness as mentioned above, two pieces of image data including a regular reflection light image and a diffused reflection light image need to be stored. For example, in the case where the regular reflection light image and the diffused reflection light image have the same data amount, it is simply required to store a double amount of image data.

Thus, with an image reading device according to an exemplary embodiment, by using a method explained below, when two pieces of image data used to display an image reproducing glossiness of a target is obtained by radiating light to the target from two directions with different angles, the amount of image data required to be stored is reduced.

Figure 3:
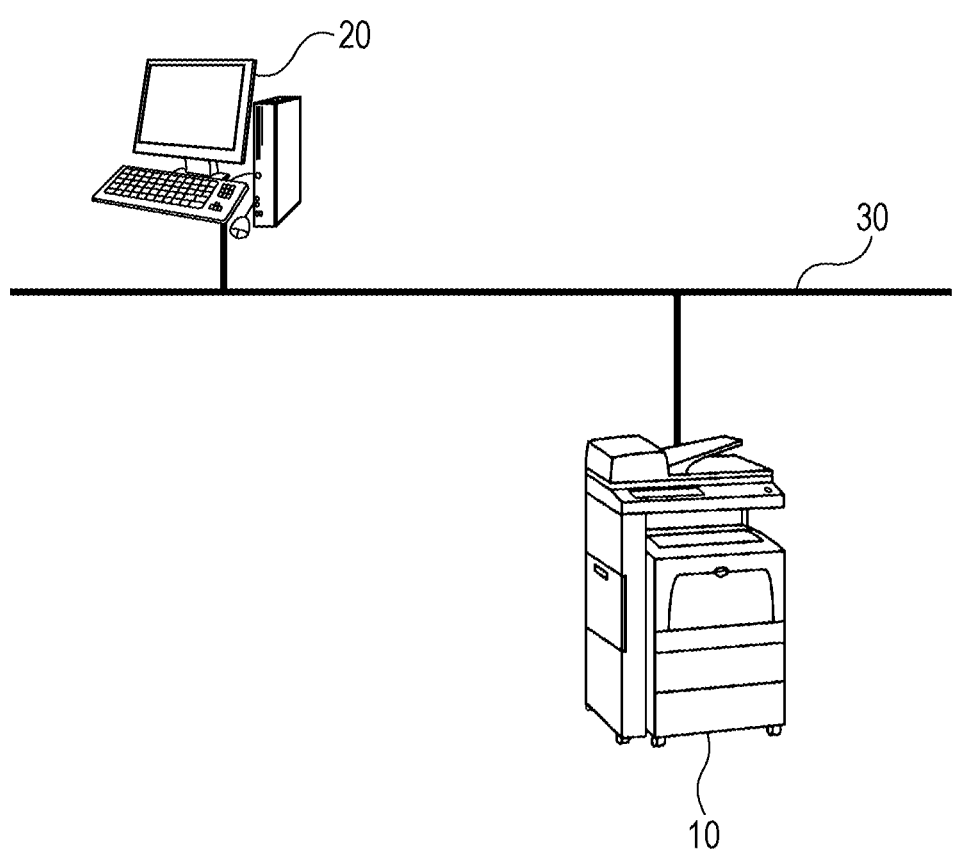
FIG. 3 is a diagram illustrating a configuration of an image forming system according to an exemplary embodiment of the disclosure.

FIG. 3 is a diagram illustrating a configuration of an image forming system including an image reading device according to an exemplary embodiment of the disclosure.

An image forming system according to an exemplary embodiment of the disclosure includes, as illustrated in FIG. 3, an image forming apparatus 10 and a terminal apparatus 20 that are connected to each other via a network 30. The terminal apparatus 20 generates printing data and transmits the generated printing data to the image forming apparatus 10 via the network 30. The image forming apparatus 10 receives the printing data transmitted from the terminal apparatus 20 and outputs an image corresponding to the printing data onto paper. The image forming apparatus 10 is a so-called multifunction apparatus having multiple functions including a printing function, a scanning function, a copying function, a facsimile function, and the like.

The image forming apparatus 10 according to an exemplary embodiment includes an image reading device that is capable of generating an image reproducing glossiness by radiating light to a reading target such as an original from two directions with different angles and obtaining images.

Figure 4:
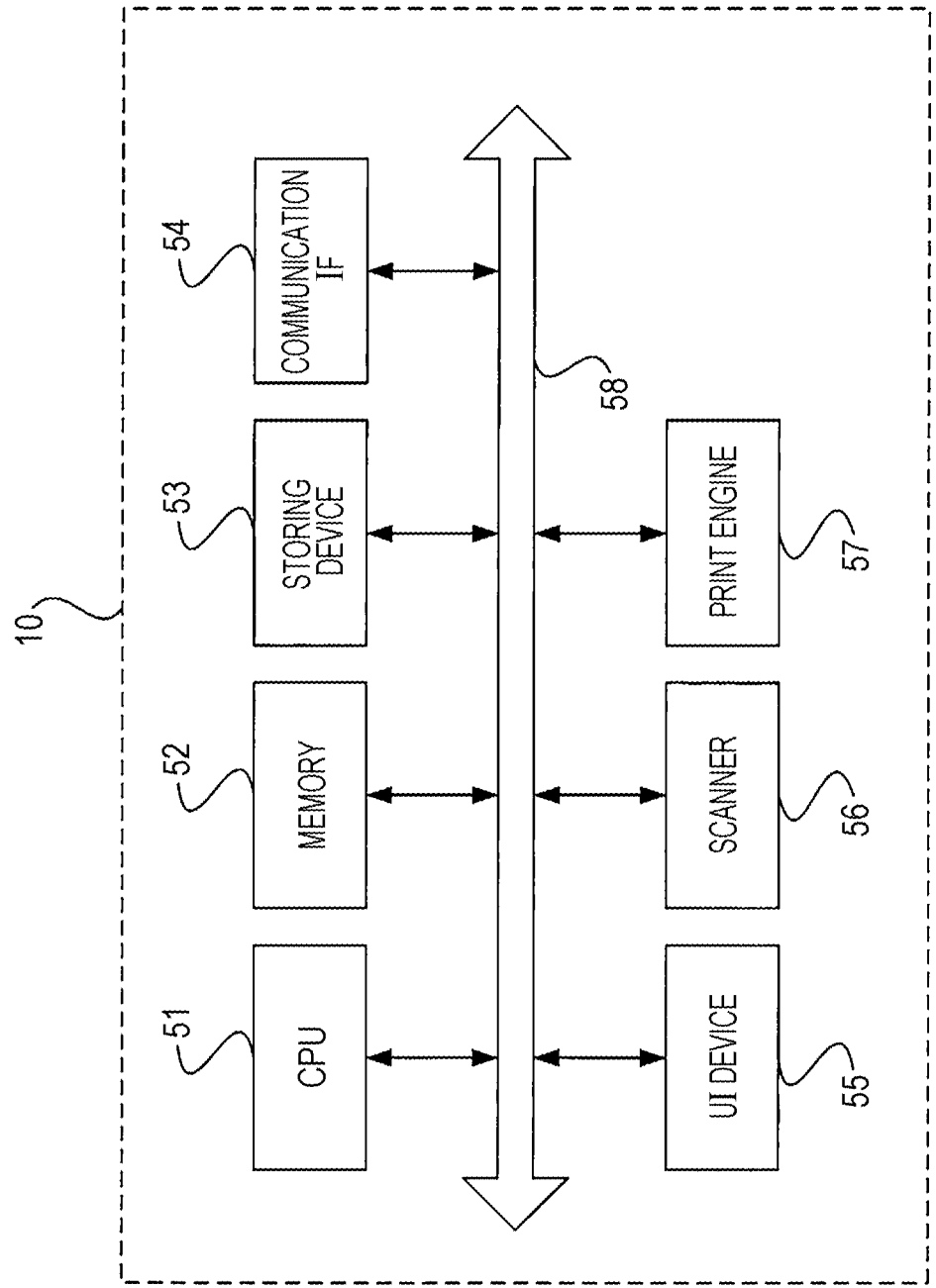
FIG. 4 is a block diagram illustrating a hardware configuration of an image forming apparatus according to an exemplary embodiment of the disclosure.

FIG. 4 illustrates a hardware configuration of the image forming apparatus 10 in an image forming system according to an exemplary embodiment.

The image forming apparatus 10 includes, as illustrated in FIG. 4, a central processing unit (CPU) 51, a memory 52, a storing device 53 such as a hard disk drive, a communication interface (abbreviated as "IF") 54 that performs transmission and reception of data to and from an external apparatus or the like via the network 30, a user interface (abbreviated as "UI") device 55 that includes a touch panel or a liquid crystal display and a keyboard, a scanner 56, and a print engine 57. These component elements are connected to one another via a control bus 58.

The CPU 51 performs predetermined processing based on a control program stored in the memory 52 or the storing device 53 to control an operation of the image forming apparatus 10. In this exemplary embodiment, the CPU 51 is explained as a unit that reads and executes the control program stored in the memory 52 or the storing device 53. However, the program may be stored in a storage medium such as a compact disc-read only memory (CD-ROM) and provided to the CPU 51.

Figure 5:
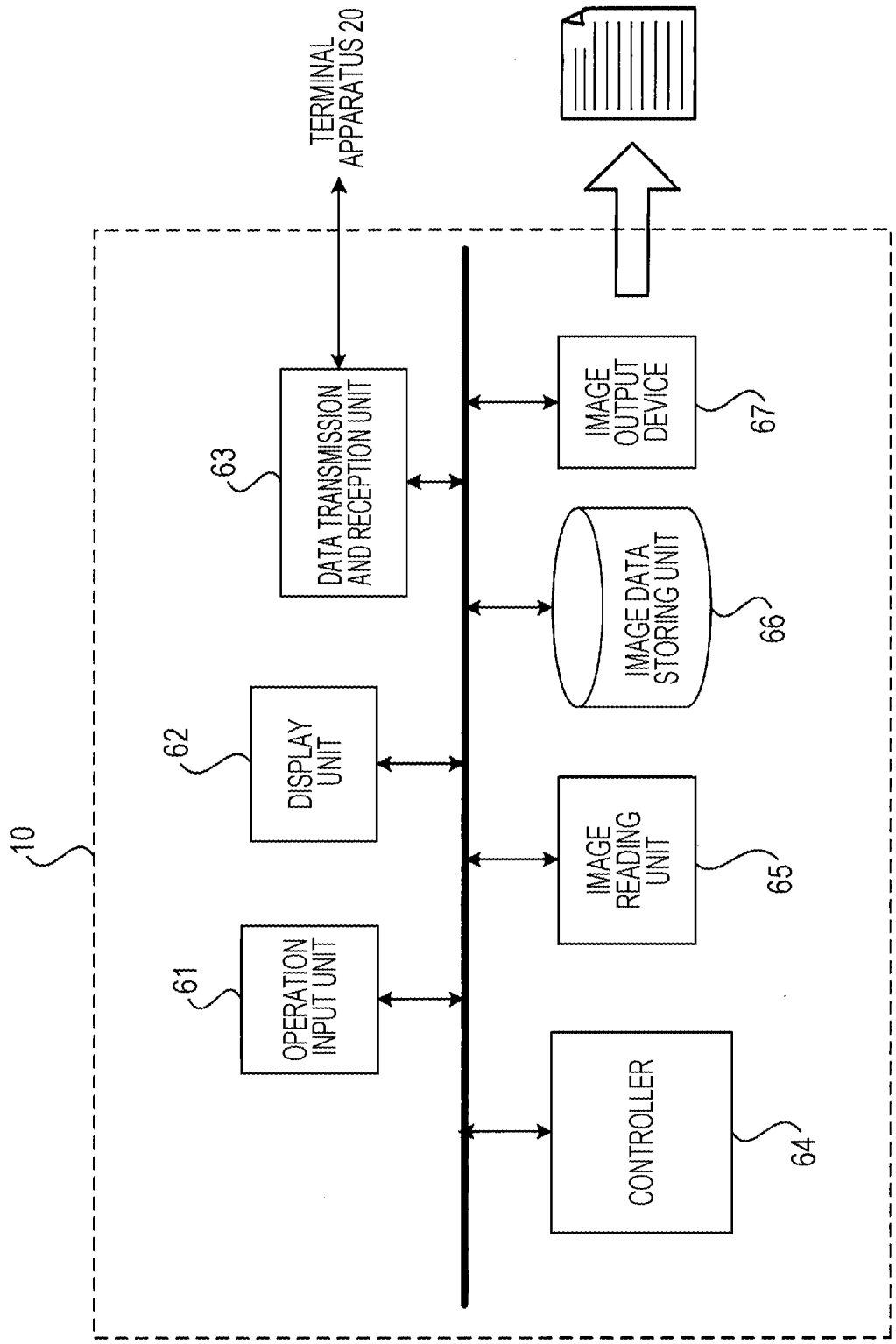
FIG. 5 is a block diagram illustrating a functional configuration of an image forming apparatus according to an exemplary embodiment of the disclosure.

FIG. 5 is a block diagram illustrating a functional configuration of the image forming apparatus 10 implemented by execution of the control program.

The image forming apparatus 10 according to this exemplary embodiment includes, as illustrated in FIG. 5, an operation input unit 61, a display unit 62, a data transmission and reception unit 63, a controller 64, an image reading unit 65, an image data storing unit 66, and an image output device 67.

The display unit 62 is controlled by the controller 64 and displays various types of information to a user. The operation input unit 61 inputs information of various operations performed by the user.

The image output device 67 outputs an image onto a recording medium such as printing paper under the control of the controller 64. The image reading unit 65 is reading means for radiating light and reading an image of a target and performs a scanning operation for reading an image of a reading target such as an original under the control of the controller 64.

As described above, the image reading unit 65 is configured to radiate light to a reading target from two directions with different angles and read images of the reading target. Specifically, the image reading unit 65 is configured to be able to read a diffused reflection light image and a regular reflection light image of a reading target.

The controller 64 performs control for generating printing data based on a print job transmitted from the terminal apparatus 20 and received by the data transmission and reception unit 63 and outputting the generated printing data via the image output device 67. Furthermore, the controller 64 controls the image reading unit 65 in accordance with an operation on the operation input unit 61 and performs scanning processing for reading an image of a reading target.

The image data storing unit 66 stores various data including printing data generated by the controller 64 and image data read by the image reading unit 65.

The controller 64 in this exemplary embodiment performs control such that, when controlling the image reading unit 65 to obtain two images of a reading target, the resolution of an image read by radiating light to the target from one direction is lower than the resolution of an image read by radiating light to the target from a different direction.

In this exemplary embodiment, two directions with different angles represent a direction for obtaining, as a read image, diffused reflection light generated when light is radiated to a reading target and a direction for obtaining, as a read image, regular reflection light generated when light is radiated to the reading target.

Thus, the controller 64 performs control such that the resolution of a regular reflection light image obtained by reading regular reflection light from a reading target is lower than the resolution of a diffused reflection light image obtained by reading diffused reflection light from the reading target.

As specific methods for making the resolution of a regular reflection light image lower than the resolution of a diffused reflection light image, various methods described below may be used.

For example, the controller 64 controls reading speed of the image reading unit 65 for reading regular reflection light from a reading target to be faster than the reading speed for reading diffused reflection light so that the resolution of a regular reflection light image obtained by reading the regular reflection light from the reading target becomes lower than the resolution of a diffused reflection light image obtained by reading the diffused reflection light from the reading target.

Alternatively, the controller 64 may decimate pixel values of a regular reflection light image so that the resolution of the regular reflection light image obtained by reading regular reflection light from a reading target becomes lower than the resolution of a diffused reflection light image obtained by reading diffused reflection light from the reading target.

In this exemplary embodiment, a case where the resolution of a diffused reflection light image is set to 600 dots per inch (dpi) and the resolution of a regular reflection light image is set to 300 dpi will be explained.

In the case where the data amount of an image with a resolution of 600 dpi is set to 1, when a regular reflection light image and a diffused reflection light image are each obtained at a resolution of 600 dpi, the total data amount is 2.

In the case where images of the same reading range are read, when the data amount of an image with a resolution of 600 dpi is set to 1, the data amount of an image with a resolution of 300 dpi is 0.25.

Thus, in the case where the resolution of a diffused reflection light image is 600 dpi and the resolution of a regular reflection light image is 300 dpi, the total data amount is 1.25, which is 62.5% (=1.25/2×100) of the case where the resolution of each of the diffused reflection light image and the regular reflection light image is 600 dpi.

Next, a specific configuration of the image reading unit 65 in the image forming apparatus 10 according to this exemplary embodiment will be explained with reference to FIG. 6.

Figure 6:
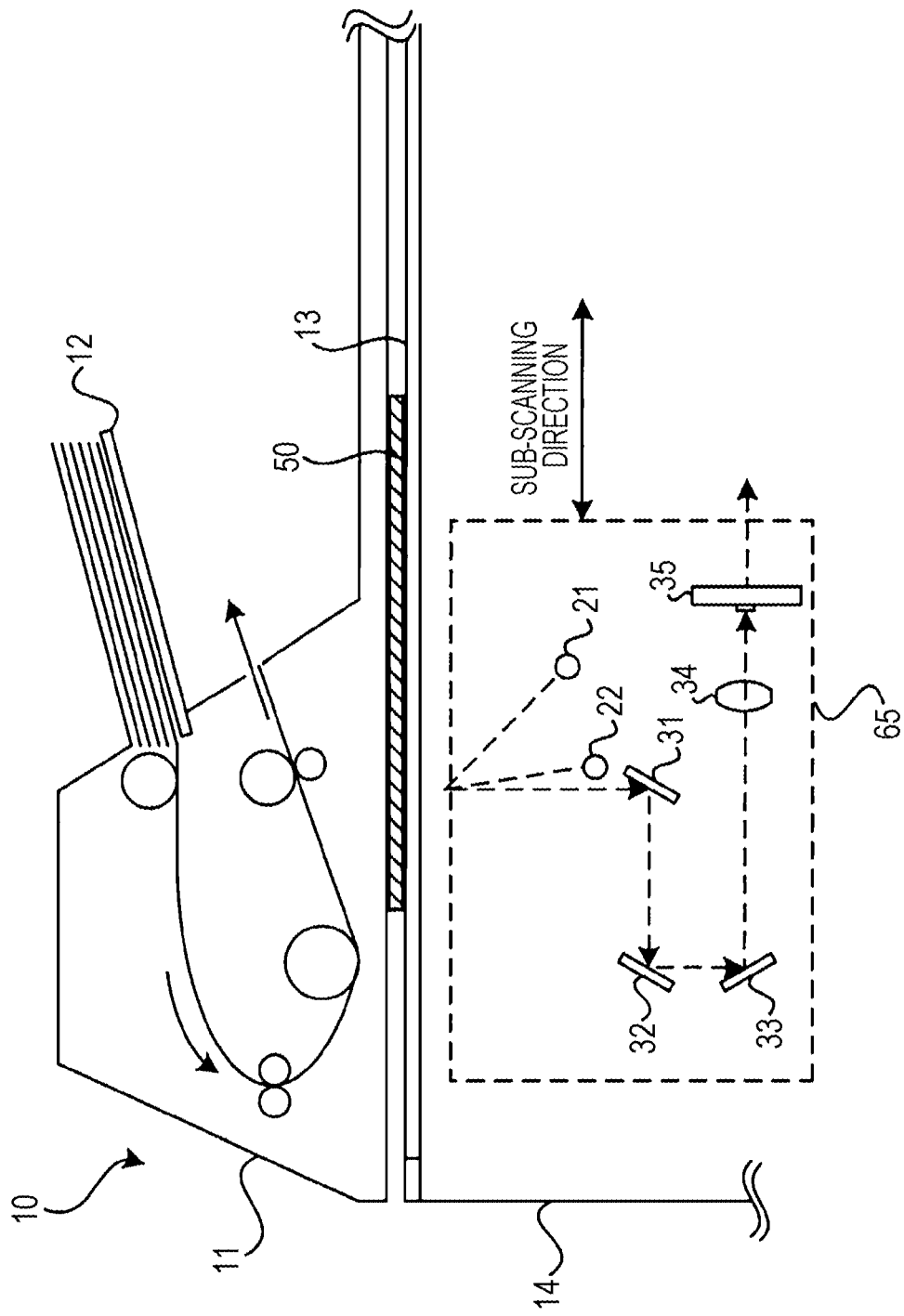
FIG. 6 is a diagram for explaining a specific configuration of an image reading unit of an image forming apparatus according to an exemplary embodiment of the disclosure.

As illustrated in FIG. 6, the image reading unit 65 includes a cover part 11 and a main body part 14.

The cover part 11 is provided with an original tray 12 on which an original to be read is placed. An original placed on the original tray 12 is transported by various transport rolls to a predetermined original reading position.

The main body part 14 includes a platen glass 13 and the image reading unit 65 for reading images of various targets such as an original transported to the original reading position, an original placed on the platen glass 13, and the like.

The image reading unit 65 includes two lamps 21 and 22 that radiate an original, reflective mirrors 31 to 33, an imaging lens 34, and a photoelectric conversion element 35 such as a charge coupled device (CCD).

The image reading unit 65 reads a regular reflection light image based on regular reflection light from the reading target 50 and a diffused reflection light image based on diffused reflection light from the reading target 50.

The image reading unit 65 is provided at a carriage, which is not illustrated in FIG. 6, and is able to move in a sub-scanning direction. Therefore, to read an image of the reading target 50 placed on the platen glass 13, the image reading unit 65 reads an original while moving in the sub-scanning direction.

Figure 7:
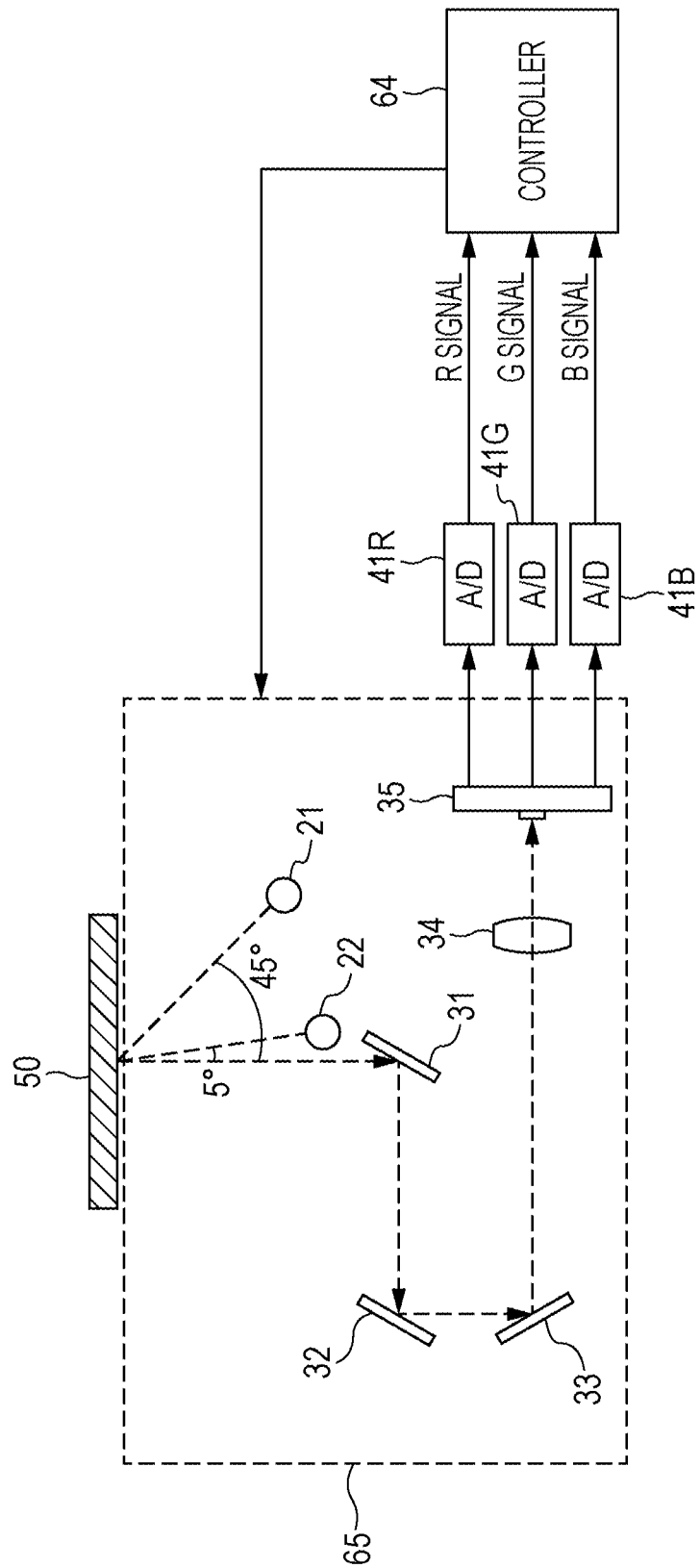
FIG. 7 is a diagram for explaining a detailed configuration of the image reading unit.

Next, a detailed configuration of the image reading unit 65 will be explained with reference to FIG. 7.

As described above, the image reading unit 65 includes the two lamps 21 and 22. The lamp 21 is a diffused reflection light source used for reading a diffused reflection light image of the reading target 50. The lamp 22 is a regular reflection light source used for reading a regular reflection light image of the reading target 50.

For example, the lamp 21 is set to radiate light to the reading target 50 at a direction of 45 degrees with respect to a line connecting the reflective mirror 31, which first reflects reflection light from the reading target 50, to the reading target 50. The lamp 22 is set to radiate light to the reading target 50 at a direction of 5 degrees with respect to a line connecting the reflective mirror 31 to the reading target 50.

Then, the reflection light from the reading target 50 is sequentially reflected by the reflective mirrors 31 to 33, passes through the imaging lens 34, and enters the photoelectric conversion element 35.

As a result, the incident reflection light is decomposed into an R signal, G signal, and B signal and output from the photoelectric conversion element 35. The analog R signal, G signal, and B signal output from the photoelectric conversion element 35 are input into A/D converters 41R, 41G, and 41B, respectively, and converted into digital R signal, G signal, and B signal, respectively.

Figure 8:
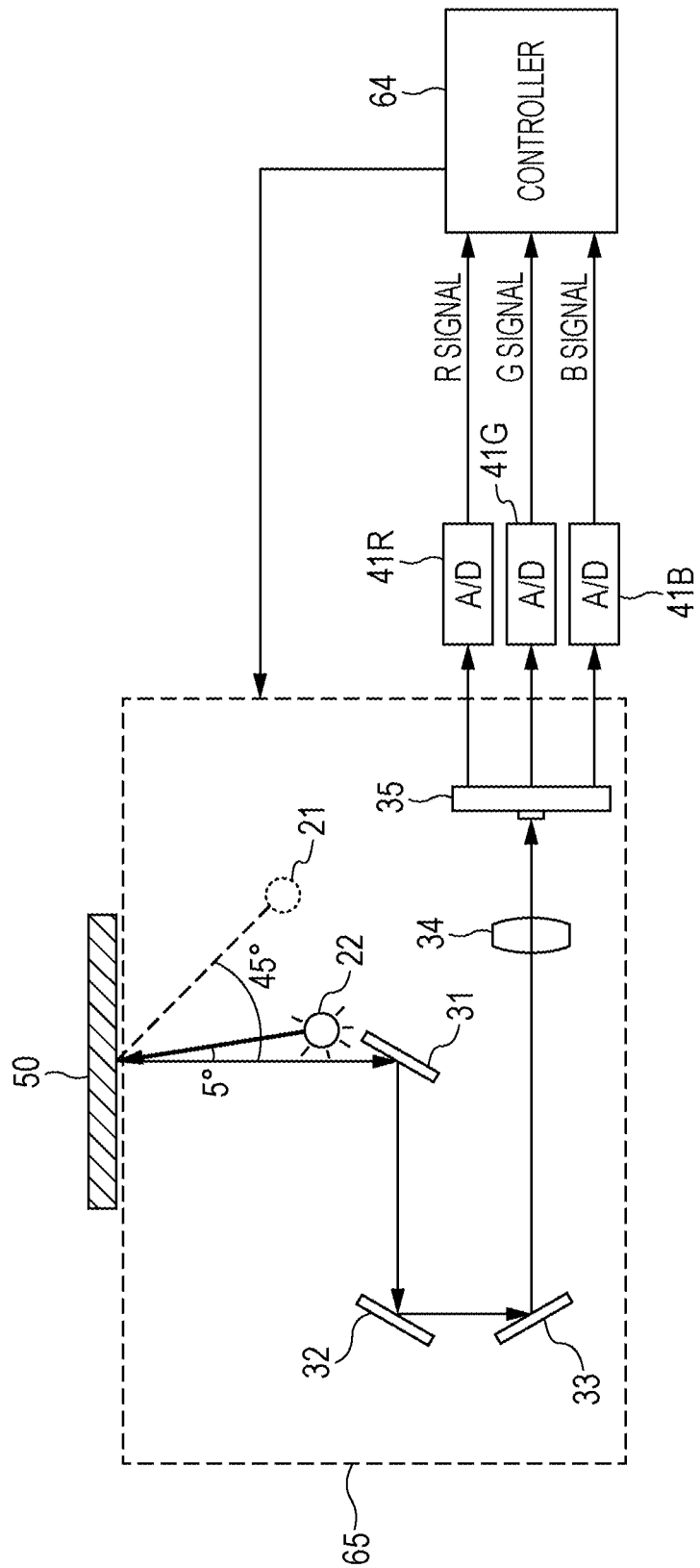
FIG. 8 is a diagram illustrating an operation of the image reading unit for reading a regular reflection light image of the reading target.
Figure 9:
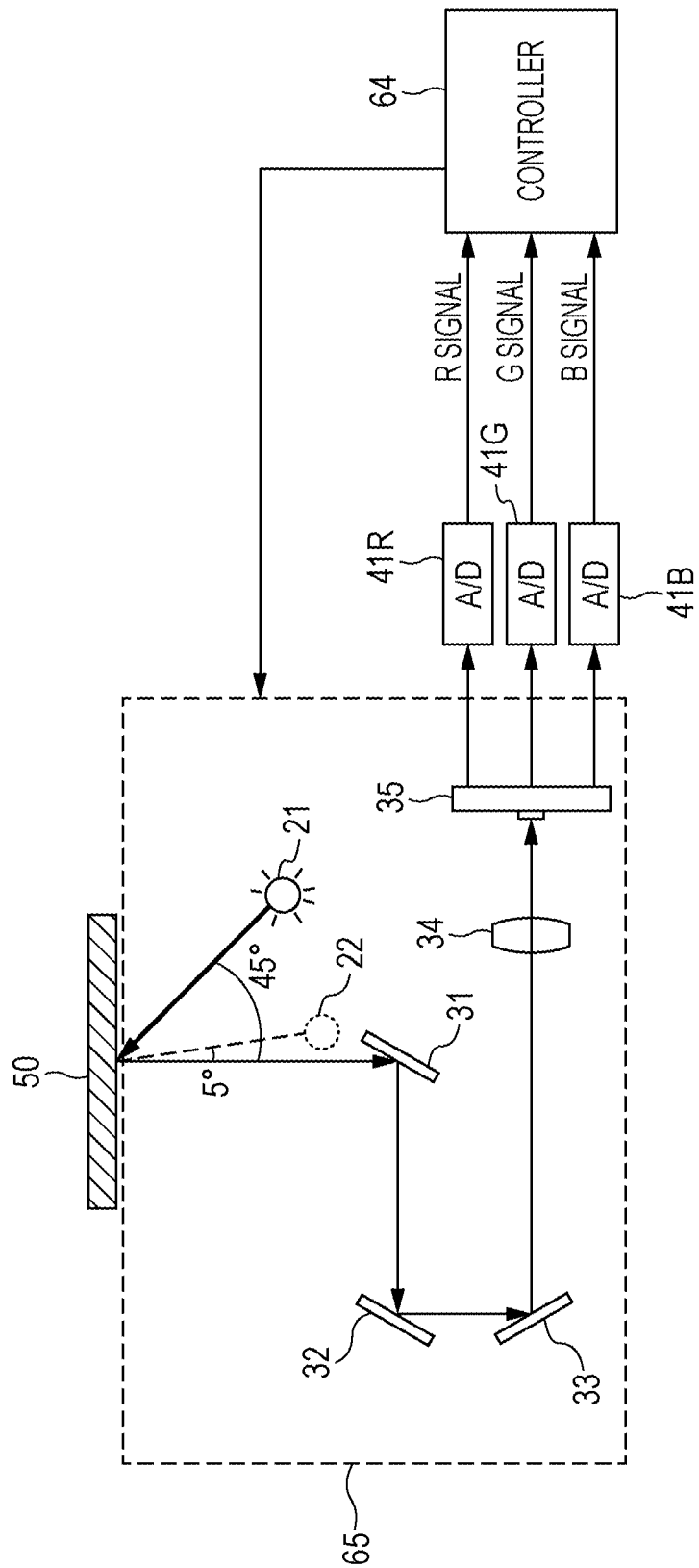
FIG. 9 is a diagram illustrating an operation of the image reading unit for reading a diffused reflection light image of the reading target.

Next, an operation of the image reading unit 65 for reading a regular reflection light image of the reading target 50 is illustrated in FIG. 8, and an operation for reading a diffused reflection light image is illustrated in FIG. 9.

To read a regular reflection light image, as illustrated in FIG. 8, the image reading unit 65 turns off the lamp 21 and turns on the lamp 22.

Light radiated from the lamp 22 is reflected by the reading target 50, travels through the reflective mirrors 31 to 33 and the imaging lens 34, and enters the photoelectric conversion element 35.

The position of the lamp 22 and the position of the reflective mirror 31 are set to be different by five degrees in order to avoid interference occurring when the lamp 22 and the reflective mirror 31 are arranged in the same line.

By the operation described above, out of reflection light from the reading target 50 with respect to light radiated from the lamp 22, only regular reflection light enters the photoelectric conversion element 35.

Furthermore, to read a diffused reflection light image, as illustrated in FIG. 9, the image reading unit 65 turns on the lamp 21 and turns off the lamp 22.

Light radiated from the lamp 21 is reflected by the reading target 50, travels through the reflective mirrors 31 to 33 and the imaging lens 34, and enters the photoelectric conversion element 35.

The lamp 21 and the reflective mirror 31 are arranged at positions that are different by 45 degrees. Therefore, out of reflection light from the reading target 50 with respect to light radiated from the lamp 21, regular reflection light does not return to the reflective mirror 31.

By the operation described above, out of reflection light from the reading target 50 with respect to light radiated from the lamp 21, only diffused reflection light enters the photoelectric conversion element 35.

Figure 10:
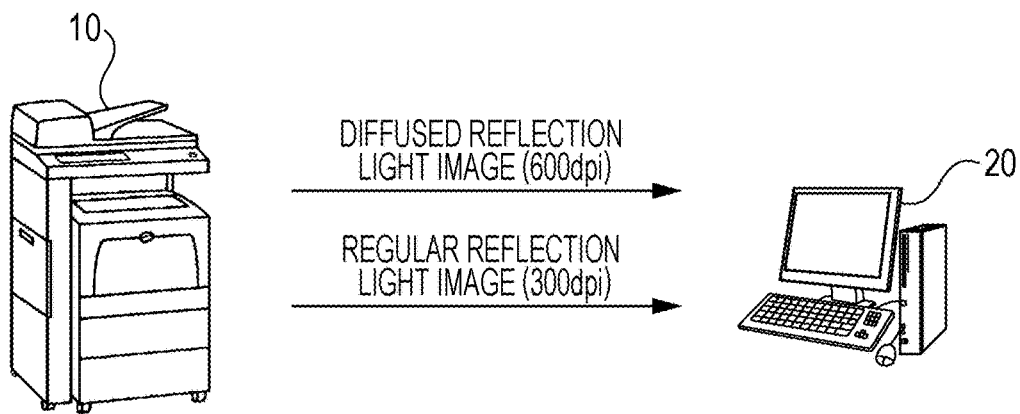
FIG. 10 is a diagram for explaining transmission of a regular reflection light image and a diffused reflection light image from the image forming apparatus to a terminal apparatus.

The regular reflection light image and the diffused reflection light image read by the image reading unit 65 are transmitted from the image forming apparatus 10 to the terminal apparatus 20, as illustrated in FIG. 10. In this exemplary embodiment, the resolution of the diffused reflection light image transmitted from the image forming apparatus 10 to the terminal apparatus 20 is 600 dpi, whereas the resolution of the regular reflection light image is 300 dpi.

In the terminal apparatus 20, viewer software (or display software) is installed. A composite image is generated by the viewer software and displayed.

Figure 11:
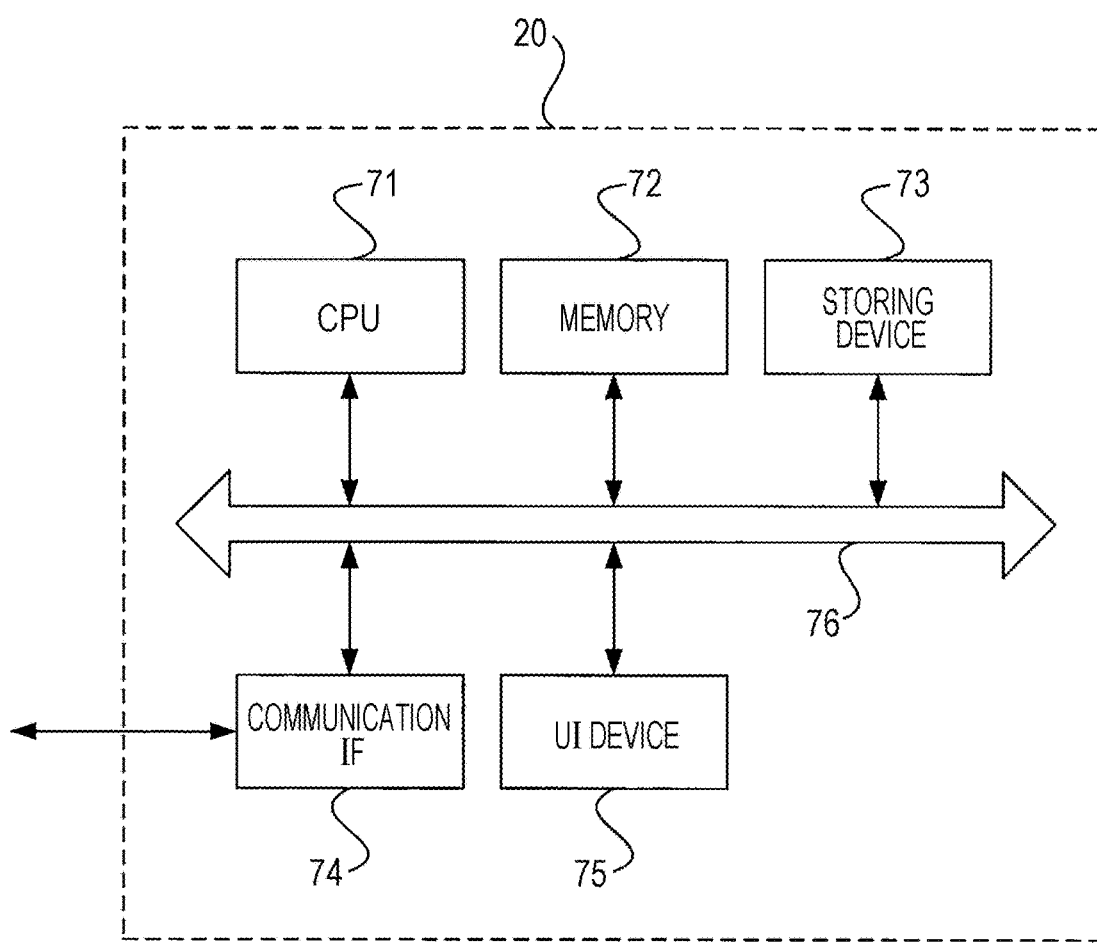
FIG. 11 is a diagram illustrating a hardware configuration of a terminal apparatus according to an exemplary embodiment of the disclosure.

Next, a hardware configuration of the terminal apparatus 20 that displays an image reproducing glossiness obtained by combining a regular reflection light image and a diffused reflection light image is illustrated in FIG. 11.

As illustrated in FIG. 11, the terminal apparatus 20 includes a CPU 71, a memory 72, a storing device 73 such as a hard disk drive, a communication interface (abbreviated as "IF") 74 that performs transmission and reception of data to and from an external apparatus via the network 30, and a user interface (abbreviated as "UI") 75 including a touch panel or a liquid crystal display and a keyboard. These component elements are connected to one another via a control bus 76.

The CPU 71 performs predetermined processing based on a control program stored in the memory 72 or the storing device 73 to control an operation of the terminal apparatus 20. In this exemplary embodiment, the CPU 71 is explained as a unit that reads and executes the control program stored in the memory 72 or the storing device 73. However, the program may be stored in a storage medium such as a CD-ROM and provided to the CPU 71.

Figure 12:
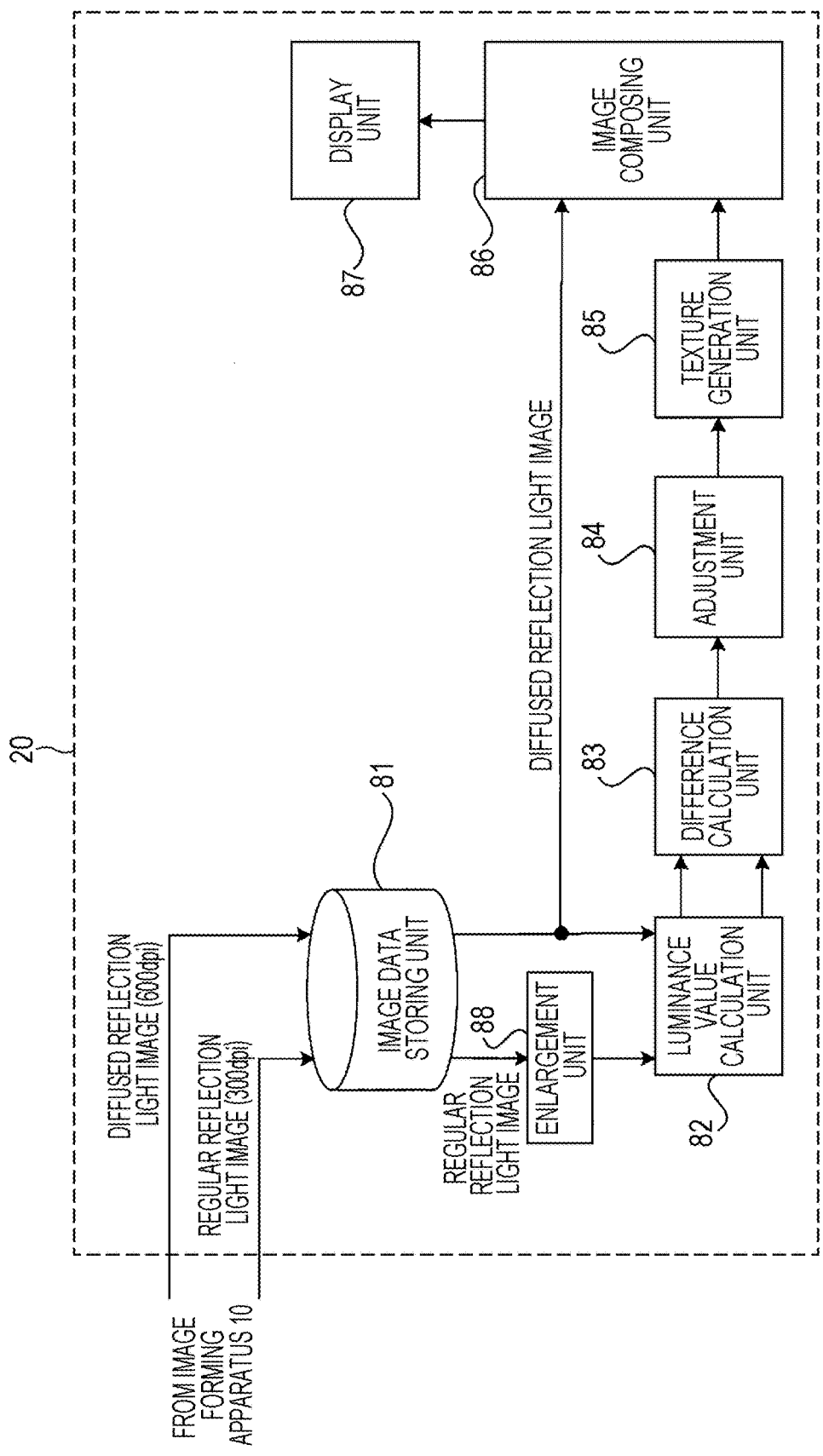
FIG. 12 is a block diagram illustrating a functional configuration of a terminal apparatus according to an exemplary embodiment of the disclosure.

FIG. 12 is a block diagram illustrating a functional configuration of the terminal apparatus 20 implemented by execution of the control program mentioned above. In FIG. 12, only a configuration for displaying an image reproducing glossiness obtained by combining a regular reflection light image and a diffused reflection light image will be explained.

The terminal apparatus 20 includes, as illustrated in FIG. 12, an image data storing unit 81, a luminance value calculation unit 82, a difference calculation unit 83, an adjustment unit 84, a texture generation unit 85, an image composing unit 86, a display unit 87, and an enlargement unit 88.

The image data storing unit 81 stores a regular reflection light image and a diffused reflection light image transmitted from the image forming apparatus 10. For example, the image data storing unit 81 stores a diffused reflection light image with a resolution of 600 dpi and a regular reflection light image with a resolution of 300 dpi.

The enlargement unit 88 enlarges a regular reflection light image stored in the image data storing unit 81 to the same size as a diffused reflection light image. Specifically, the enlargement unit 88 enlarges the regular reflection light image with a resolution of 300 dpi to the same size as the diffused reflection light image, which is 600 dpi.

In the case where an instruction to display an image reproducing glossiness is issued, the luminance value calculation unit 82 calculates a luminance value of the diffused reflection light image stored in the image data storing unit 81 and a luminance value of the regular reflection light image enlarged by the enlargement unit 88.

The difference calculation unit 83 calculates, for each pixel, a difference between the luminance value of the regular reflection light image and the luminance value of the diffused reflection light image calculated by the luminance value calculation unit 82. That is, the difference calculation unit 83 calculates a difference between the regular reflection light image enlarged by the enlargement unit 88 and the diffused reflection light image. The difference image obtained by the difference calculation unit 83 is used as glossiness information of a reading target.

That is, a pixel with a large difference between the luminance value of the regular reflection light image and the luminance value of the diffused reflection light image corresponds to a part with a high glossiness. In contrast, a pixel with a small difference or no difference between the luminance value of the regular reflection light image and the luminance value of the diffused reflection light image corresponds to a part with a low glossiness or no glossiness.

The adjustment unit 84 performs adjustment of glossiness of a difference image obtained by the difference calculation unit 83, for example, processing for enhancing or reducing glossiness. Furthermore, the texture generation unit 85 performs processing, for a difference image whose glossiness has been adjusted by the adjustment unit 84, such that the amount of reflection of a glossy part is calculated and changed in accordance with a display angle, the position of an assumed light source, and the like.

The image composing unit 86 combines, as glossiness information, the difference image for which the amount of reflection has been calculated by the texture generation unit 85 with a diffused reflection light image representing color information stored in the image data storing unit 81. That is, the image composing unit 86 combines the difference image calculated by the difference calculation unit 83 with the diffused reflection light image to generate an image representing glossiness of a reading target.

The display unit 87 displays an image composed by the image composing unit 86.

Enlarging a regular reflection light image to the same size as a diffused reflection light image and then combining the enlarged regular reflection light image with the diffused reflection light image as described above will be explained with reference to FIGS. 13 and 14.

Figure 13:
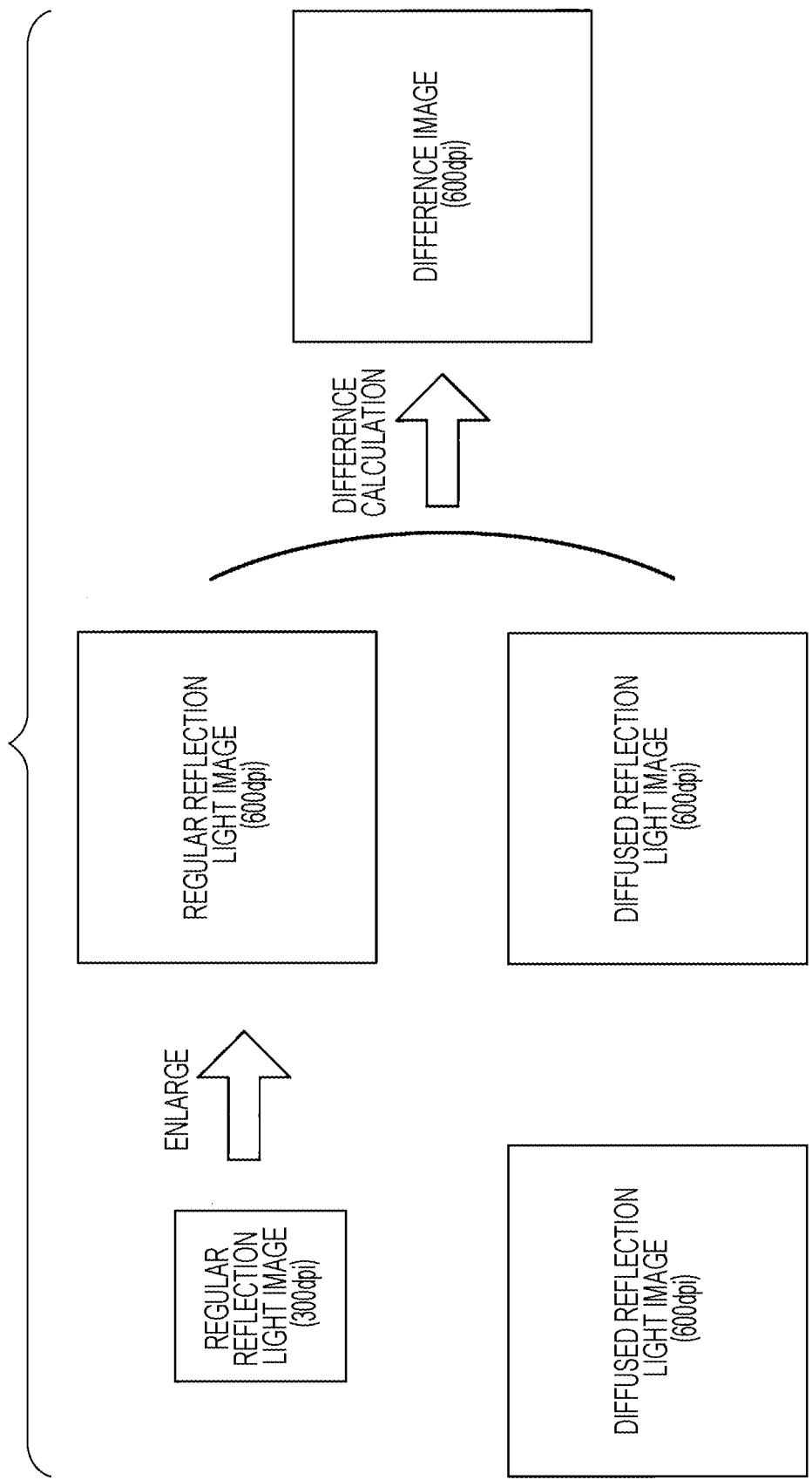
FIG. 13 is a diagram illustrating doubling of a regular reflection light image with a resolution of 300 dpi to a resolution of 600 dpi and calculation of a difference between the enlarged regular reflection light image with the resolution of 600 dpi and a diffused reflection light image with a resolution of 600 dpi.

FIG. 13 illustrates doubling of a regular reflection light image with a resolution of 300 dpi to a resolution of 600 dpi and calculation of a difference between the enlarged regular reflection light image with the resolution of 600 dpi and a diffused reflection light image with a resolution of 600 dpi.

The resolution of the regular reflection light image and the resolution of the diffused reflection light image are each 600 dpi. Therefore, an obtained difference image naturally has a resolution of 600 dpi.

Figure 14:
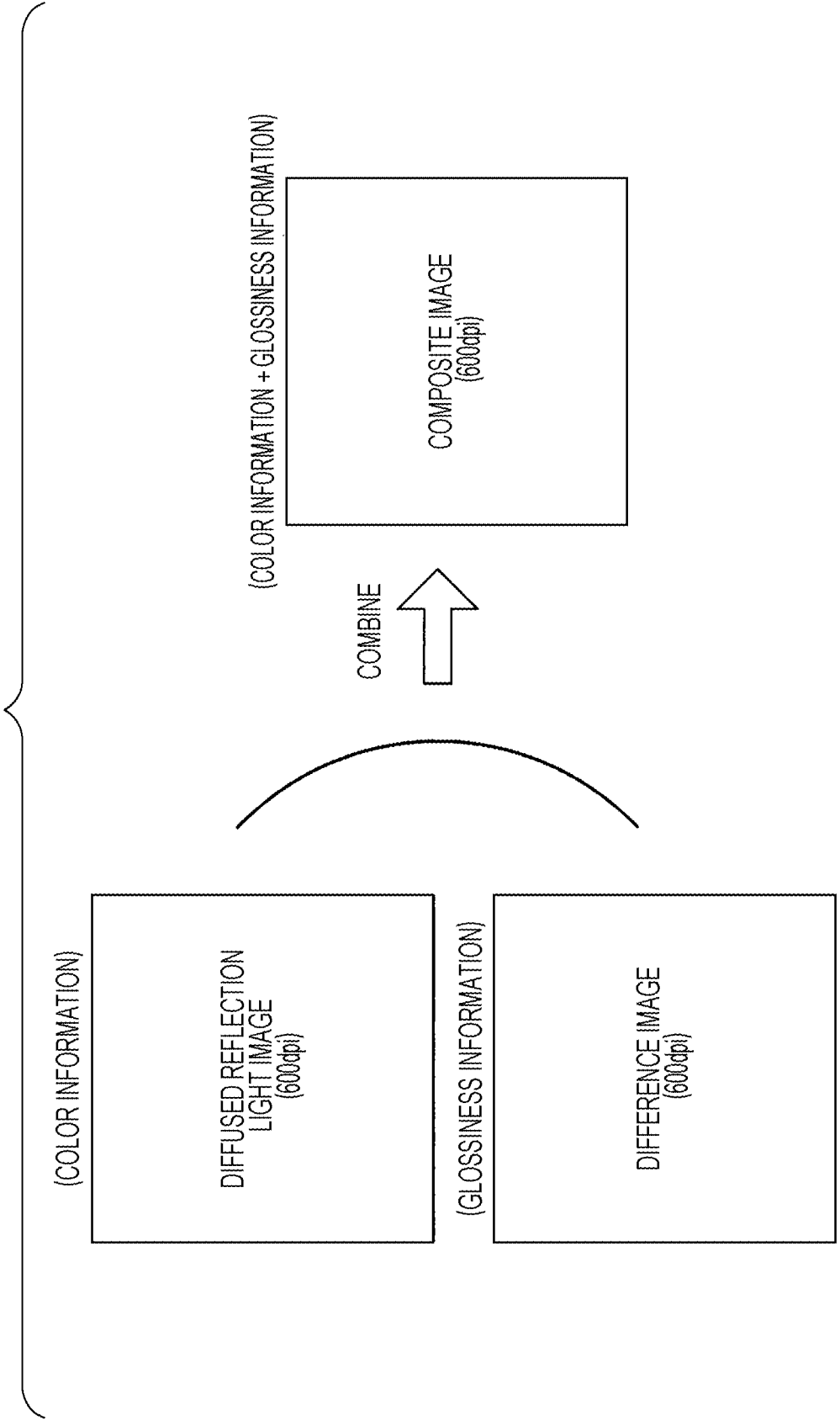
FIG. 14 is a diagram illustrating combining of a difference image obtained by difference calculation with a diffused reflection light image.

FIG. 14 illustrates combining of the difference image obtained as described above with the diffused reflection light image. FIG. 14 illustrates generation of a composite image with a resolution of 600 dpi by combining of a diffused reflection light image with a resolution of 600 dpi with a difference image with a resolution of 600 dpi.

As described above, a diffused reflection light image is an image mainly containing color information of a reading target, and a difference image is an image mainly containing glossiness information of a reading target.

In this exemplary embodiment, an obtained regular reflection light image of a reading target has half the resolution of a diffused reflection light image. The regular reflection light image is an image obtained to calculate glossiness information of the reading target. If the information amount of the glossiness information slightly decreases, it is difficult for human beings to visually recognize the decrease. In contrast, the diffused reflection light image is an image containing color information of the reading target. Thus, if the resolution of the diffused reflection light image decreases, the amount of color information in the obtained composite image also decreases, and human beings easily recognize the decrease.

Thus, in this exemplary embodiment, the regular reflection light image obtained to acquire glossiness information is read at a low resolution, and the diffused reflection light image obtained to acquire color information is read at a high resolution.

As a result, the amount of image data required to be stored in the image data storing unit 81 of the terminal apparatus 20 is reduced, whereas a decrease in the color information of the composite image displayed on the display unit 87 is prevented.

The case where a regular reflection light image is enlarged to the same size as a diffused reflection light image and a difference image is then obtained, has been explained above. However, to the contrary, after reducing a diffused reflection light image to the same size as a regular reflection light image, difference calculation may be performed.

Figure 15:
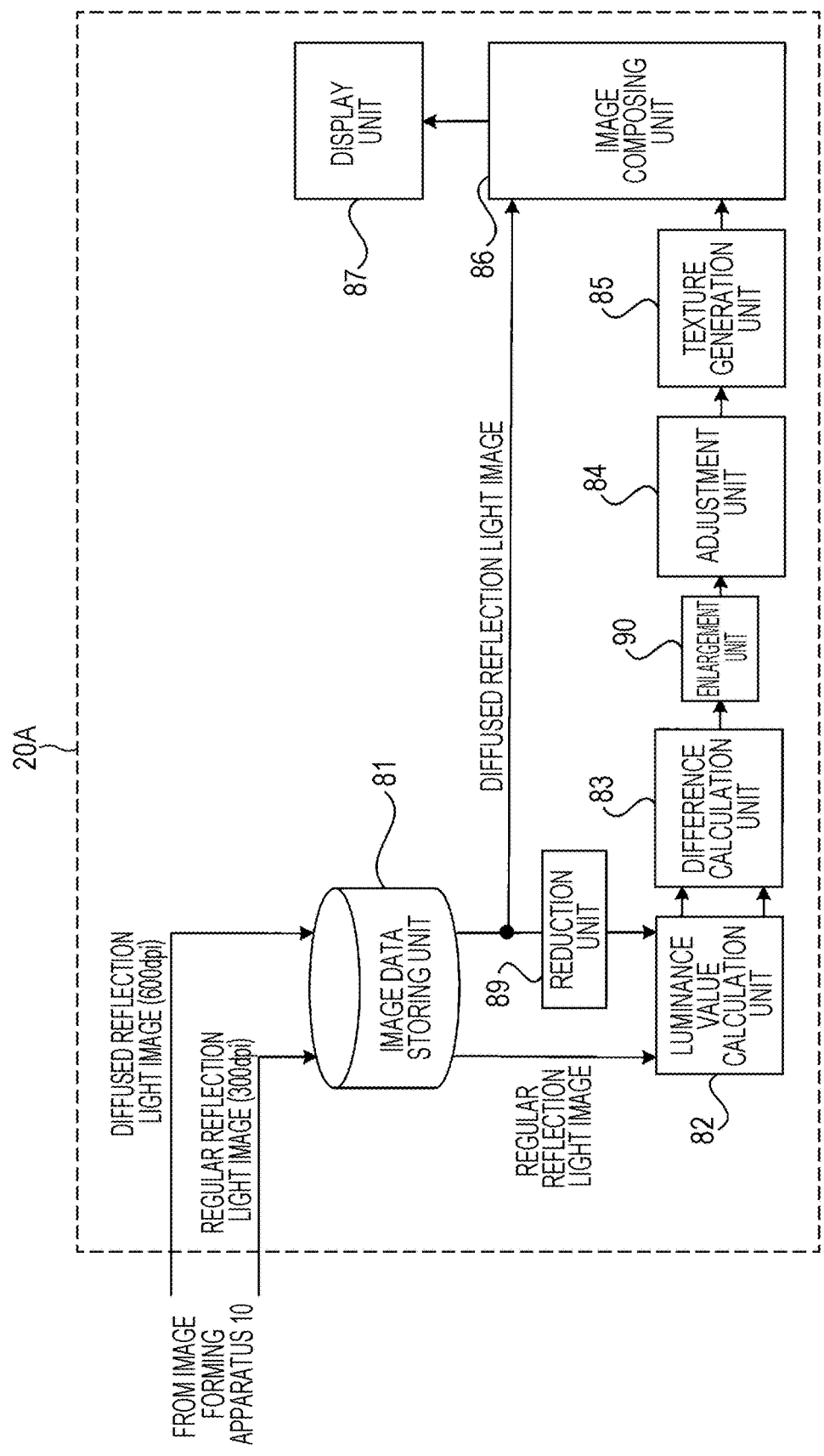
FIG. 15 is a block diagram illustrating a functional configuration of a terminal apparatus in a case where a diffused reflection light image is reduced to the same size as a regular reflection light image and difference calculation is then performed.

FIG. 15 is a block diagram illustrating a functional configuration of a terminal apparatus 20A that performs the calculation described above. In FIG. 15, the same functional blocks as those in FIG. 12 are referred to with the same signs and explanations for those same functional blocks will be omitted.

The terminal apparatus 20A includes, as illustrated in FIG. 15, an image data storing unit 81, a luminance value calculation unit 82, a difference calculation unit 83, an adjustment unit 84, a texture generation unit 85, an image composing unit 86, a display unit 87, a reduction unit 89, and an enlargement unit 90.

The reduction unit 89 reduces a diffused reflection light image with a resolution of 600 dpi stored in the image data storing unit 81 to the same size as a regular reflection light image, which is 300 dpi.

The luminance value calculation unit 82 calculates the luminance value of the regular reflection light image stored in the image data storing unit 81 and the luminance value of a diffused reflection light image reduced by the reduction unit 89.

The difference calculation unit 83 calculates, for each pixel, a difference between the luminance value of the regular reflection light image and the luminance value of the diffused reflection light image calculated by the luminance value calculation unit 82. That is, the difference calculation unit 83 calculates a difference between the diffused reflection light image reduced by the reduction unit 89 and the regular reflection light image stored in the image data storing unit 81.

Then, the enlargement unit 90 enlarges a difference image obtained by the difference calculation unit 83 to the same size as the diffused reflection light image, which is 600 dpi.

Glossiness of the difference image enlarged by the enlargement unit 90 is adjusted by the adjustment unit 84, and adjustment of the amount of reflection of a glossy part and the like are performed by the texture generation unit 85. Then, the image composing unit 86 combines the processed difference image with the diffused reflection light image to generate an image representing glossiness of a reading target.

Figure 16:
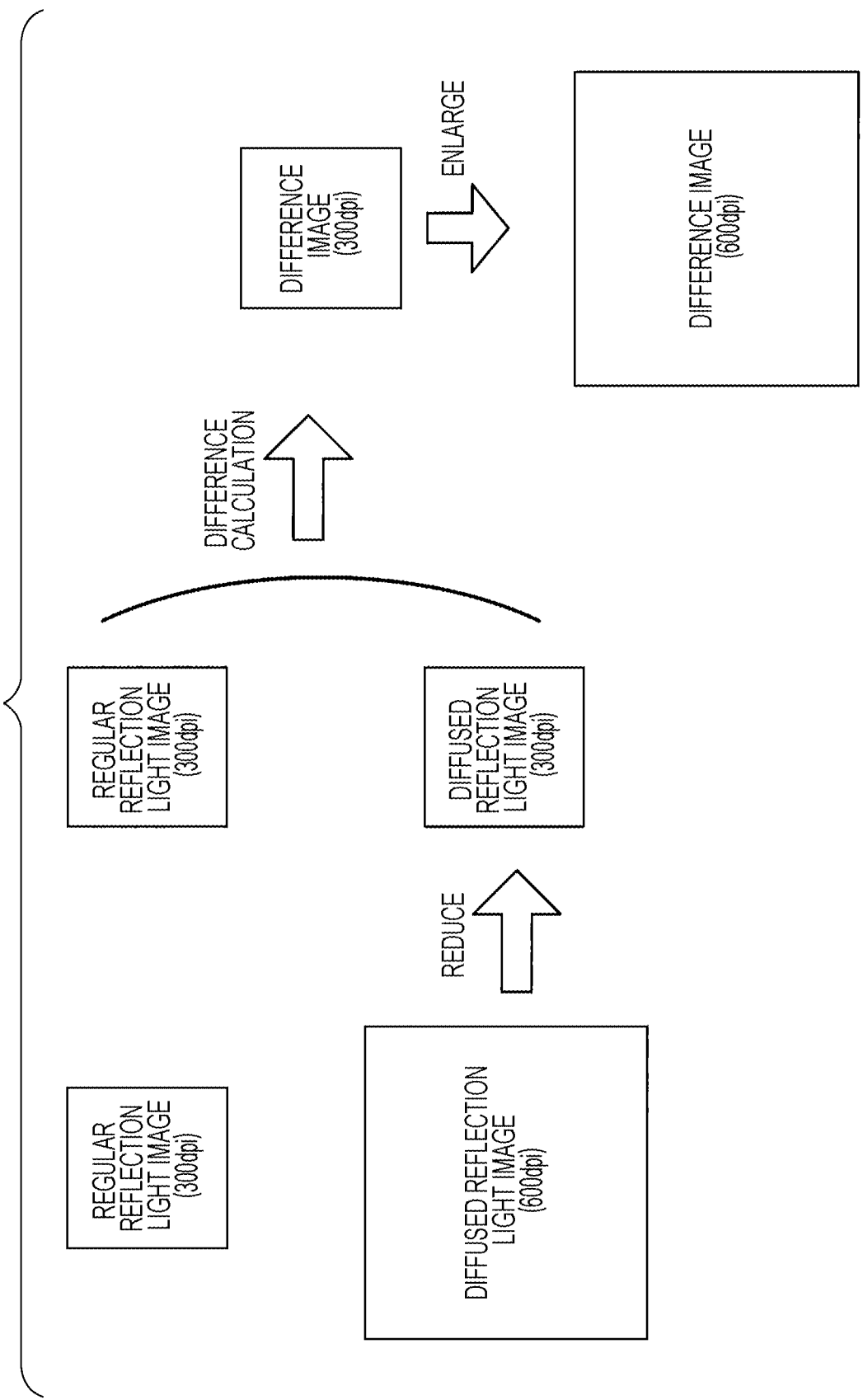
FIG. 16 is a diagram illustrating reduction of a diffused reflection light image and calculation of a difference image.

FIG. 16 illustrates reduction of a diffused reflection light image and calculation of a difference image.

FIG. 16 illustrates reduction of a diffused reflection light image with a resolution of 600 dpi by half to a resolution of 300 dpi and calculation of a difference between the reduced diffused reflection light image with the resolution of 300 dpi and a regular reflection light image with a resolution of 300 dpi.

The resolution of the regular reflection light image and the resolution of the diffused reflection light image are each 300 dpi. Therefore, an obtained difference image naturally has a resolution of 300 dpi.

However, to generate a final composite image, the difference image needs to be combined with the diffused reflection light image with the resolution of 600 dpi. Thus, the enlargement unit 90 enlarges the difference image with 300 dpi to the resolution of 600 dpi.

The difference image obtained as described above is combined with the diffused reflection light image as illustrated in FIG. 14. FIG. 14 illustrates generation of a composite image with a resolution of 600 dpi by combining a diffused reflection light image with a resolution of 600 dpi with a difference image with a resolution of 600 dpi.

Modification

In the exemplary embodiment described above, the case where the present disclosure is applied to an image reading device provided in the image forming apparatus 10 has been explained. However, the present disclosure is not limited to this. The present disclosure is also applicable to various image reading devices such as a scanner device.

Furthermore, in the exemplary embodiment described above, the case where a regular reflection light image and a diffused reflection light image of a reading target are read by an image reading device of the image forming apparatus 10 and the terminal apparatus 20 combines the two images and displays the composite image as an image reproducing glossiness has been described. However, the present disclosure is not limited to this. A configuration of an image reading device that reads a regular reflection light image and a diffused reflection light image and a configuration of a terminal apparatus that combines the two images and displays the composite image may be provided in an image processing device as a single apparatus.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
two light sources configured to radiate light to a target from two directions with different angles;
a sensor configured to read two images of the target; and
a controller configured to control the sensor to acquire the two images of the target, and control a resolution of the image read by radiating the light to the target from one of the two directions is lower than a resolution of the image read by radiating the light to the target from the other one of the two directions, wherein
the two directions with the different angles are a direction for obtaining diffused reflection light as a read image, the diffused reflection light being generated when the light is radiated to the target, and a direction for obtaining regular reflection light as a read image, the regular reflection light being generated when the light is radiated to the target, and
the controller is configured to control a resolution of a regular reflection light image obtained by reading the regular reflection light from the target to be lower than a resolution of a diffused reflection light image obtained by reading the diffused reflection light from the target.

2. The image processing apparatus according to claim 1, wherein the controller is configured to
set a reading speed of the sensor for reading the regular reflection light from the target to be faster than a reading speed for reading the diffused reflection light to control the resolution of the regular reflection light image obtained by reading the regular reflection light from the target to be lower than the resolution of the diffused reflection light image obtained by reading the diffused reflection light from the target.

3. The image processing apparatus according to claim 1, wherein the controller is configured to
decimate pixel values of the regular reflection light image to control the resolution of the regular reflection light image obtained by reading the regular reflection light from the target to be lower than the resolution of the diffused reflection light image obtained by reading the diffused reflection light from the target.

4. An image processing system comprising:
the image processing apparatus according to claim 1,
a terminal comprising:
a memory configured to store the regular reflection light image and the diffused reflection light image; and
a processor configured to
enlarge the regular reflection light image to a same size as the diffused reflection light image;
calculate a difference between the regular reflection light image that is enlarged and the diffused reflection light image; and
combine a difference image obtained by the processor with the diffused reflection light image to generate an image representing glossiness of the target; and
a display configured to display the image representing glossiness of the target.

5. An image processing system comprising:
the image processing apparatus according to claim 2,
a terminal comprising:
a memory configured to store the regular reflection light image and the diffused reflection light image; and
a processor configured to
enlarge the regular reflection light image to a same size as the diffused reflection light image;
calculate a difference between the regular reflection light image that is enlarged and the diffused reflection light image; and
combine a difference image obtained by the processor with the diffused reflection light image to generate an image representing glossiness of the target; and
a display configured to display the image representing glossiness of the target.

6. An image processing system comprising:
the image processing apparatus according to claim 3,
a terminal comprising:
a memory configured to store the regular reflection light image and the diffused reflection light image; and
a processor configured to
enlarge the regular reflection light image to a same size as the diffused reflection light image;
calculate a difference between the regular reflection light image that is enlarged and the diffused reflection light image; and
combine a difference image obtained by the processor with the diffused reflection light image to generate an image representing glossiness of the target; and
a display configured to display the image.

7. An image processing system comprising:
the image processing apparatus according to claim 1,
a terminal comprising;
a memory configured to store the regular reflection light image and the diffused reflection light image; and
a processor configured to
reduce the diffused reflection light image to a same size as the regular reflection light image;
calculate a difference between the diffused reflection light image that is reduced and the regular reflection light image;
enlarge a difference image obtained by the processor to a same size as the diffused reflection light image;
combine the difference image enlarged by the processor with the diffused reflection light image to generate an image representing glossiness of the target; and
a display configured to display the image representing glossiness of the target.

8. An image processing system comprising:
the image processing apparatus according to claim 2,
a terminal comprising:
a memory configured to store the regular reflection light image and the diffused reflection light image; and
a processor configured to
reduce the diffused reflection light image to a same size as the regular reflection light image;
calculate a difference between the diffused reflection light image that is reduced and the regular reflection light image;
enlarge a difference image obtained by the processor to a same size as the diffused reflection light image;
combine the difference image enlarged by the processor with the diffused reflection light image to generate an image representing glossiness of the target; and
a display configured to display the image representing glossiness of the target.

9. An image processing system comprising:
the image processing apparatus according to claim 3,
a terminal comprising:
a memory configured to store the regular reflection light image and the diffused reflection light image; and
a processor configured to reduce the diffused reflection light image to a same size as the regular reflection light image;

calculate a difference between the diffused reflection light image that is reduced and the regular reflection light image;

enlarge a difference image obtained by the processor to a same size as the diffused reflection light image;

combine the difference image enlarged by the processor with the diffused reflection light image to generate an image representing glossiness of the target; and a display configured to display the image representing glossiness of the target.

10. A non-transitory computer readable medium storing a program causing a computer to execute a process for image processing, the process comprising:

radiating light to a target from two directions with different angles and reading two images of the target, wherein the two directions with the different angles are a direction for obtaining diffused reflection light as a read image, the diffused reflection light being generated when the light is radiated to the target, and a direction for obtaining regular reflection light as a read image, the regular reflection light being generated when the light is radiated to the target;

controlling, when acquiring the two images of the target, such that a resolution of the image read by radiating the light to the target from one of the two directions is lower than a resolution of the image read by radiating the light to the target from the other one of the two directions; and controlling a resolution of a regular reflection light image obtained by reading the regular reflection light from the target to be lower than a resolution of a diffused reflection light image obtained by reading the diffused reflection light from the target.

11. An image processing apparatus comprising:

reading means for radiating light to a target from two directions with different angles and reading two images of the target, wherein the two directions with the different angles are a direction for obtaining diffused reflection light as a read image, the diffused reflection light being generated when the light is radiated to the target, and a direction for obtaining regular reflection light as a read image, the regular reflection light being generated when the light is radiated to the target; and control means for controlling, when controlling the reading means to acquire the two images of the target, such that a resolution of the image read by radiating the light to the target from one of the two directions is lower than a resolution of the image read by radiating the light to the target from the other one of the two directions, and a resolution of a regular reflection light image obtained by reading the regular reflection light from the target to be lower than a resolution of a diffused reflection light image obtained by reading the diffused reflection light from the target.

* * * * *